(12) United States Patent
Uehara et al.

(10) Patent No.: US 11,454,298 B2
(45) Date of Patent: Sep. 27, 2022

(54) TORQUE LIMITER AND POWER TRANSMISSION DEVICE

(71) Applicant: EXEDY Corporation, Neyagawa (JP)

(72) Inventors: Hiroshi Uehara, Neyagawa (JP); Yoshiyuki Hagihara, Neyagawa (JP); Masahiro Maeda, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 349 days.

(21) Appl. No.: 16/899,973

(22) Filed: Jun. 12, 2020

(65) Prior Publication Data

US 2021/0102598 A1    Apr. 8, 2021

(30) Foreign Application Priority Data

Oct. 2, 2019   (JP) .............................. JP2019-181988

(51) Int. Cl.
| | |
|---|---|
| *F16F 15/139* | (2006.01) |
| *F16F 15/12* | (2006.01) |
| *F16F 15/134* | (2006.01) |
| *F16D 7/02* | (2006.01) |

(52) U.S. Cl.
CPC .......... *F16F 15/1397* (2013.01); *F16D 7/025* (2013.01); *F16F 15/1201* (2013.01); *F16F 15/13415* (2013.01)

(58) Field of Classification Search
CPC ................ F16F 15/1397; F16F 15/1201; F16F 15/13415; F16D 7/025
See application file for complete search history.

(56) References Cited

U.S. PATENT DOCUMENTS

| | | | | |
|---|---|---|---|---|
| 7,819,751 | B2 * | 10/2010 | Ebata .................. | F16F 15/1395 464/68.41 |
| 10,948,024 | B1 * | 3/2021 | Uehara .................. | F16D 13/64 |
| 2008/0078646 | A1 * | 4/2008 | Ebata .................. | F16F 15/1395 192/30 V |

(Continued)

FOREIGN PATENT DOCUMENTS

| | | | | |
|---|---|---|---|---|
| CN | 103221715 A | * | 7/2013 | ............... F16D 3/12 |
| JP | 2007198434 A | * | 8/2007 | |

(Continued)

*Primary Examiner* — Vishal R Sahni

(74) *Attorney, Agent, or Firm* — United IP Counselors, LLC

(57) ABSTRACT

A torque limiter fixed to a flywheel including an annular portion and an accommodation portion is disclosed. The torque limiter includes a first plate, a second plate axially opposed to the first plate, a friction disc disposed between the first and second plates, a pressing member, and a third plate. A torque is inputted to the first plate. The pressing member presses the second plate onto the friction disc. The third plate supports the pressing member with the second plate therebetween while the pressing member is compressed. The third plate includes a support portion supporting the pressing member and a tubular portion provided in an outer peripheral part of the support portion. The tubular portion covers an outer peripheral surface of the friction disc. The tubular portion axially extends and is opposed to an inner peripheral surface of the annular portion of the flywheel, and includes first openings circumferentially aligned.

9 Claims, 6 Drawing Sheets

(56) References Cited

U.S. PATENT DOCUMENTS

2008/0110719 A1* 5/2008 Saeki .................... F16F 15/129
192/109 A

FOREIGN PATENT DOCUMENTS

| JP | 2008-089017 A | 4/2008 | | |
|---|---|---|---|---|
| JP | 2010223401 A | * | 10/2010 | ............. F16D 7/025 |
| WO | WO-2012168997 A1 | * | 12/2012 | ............. F16D 7/025 |

* cited by examiner

TORQUE LIMITER AND POWER TRANSMISSION DEVICE

CROSS-REFERENCE TO RELATED APPLICATIONS

This application claims priority to Japanese Patent Application No. 2019-181988, filed Oct. 2, 2019. The contents of that application are incorporated by reference herein in their entirety.

TECHNICAL FIELD

The present invention relates to a torque limiter, particularly to a torque limiter disposed between a flywheel including an accommodation portion and an output-side member.

BACKGROUND ART

A type of hybrid vehicle including an engine and an electric motor, for instance, uses such a torque fluctuation absorbing device having a torque limiter function as described in Japan Laid-open Patent Application Publication No. 2008-89017 in order to prevent transmission of an excessive torque from an output side to an engine side in engine start and so forth.

The torque fluctuation absorbing device described in Japan Laid-open Patent Application Publication No. 2008-89017 1 is provided with a damper part, including a pair of plates and a plurality of torsion springs, and a torque limiter disposed on an outer peripheral side of the damper part. The damper part and the torque limiter are accommodated in an accommodation portion provided in a flywheel. The flywheel is provided with an annular portion on the outer peripheral side of the accommodation portion. A plate of the torque limiter is fixed to the annular portion by a plurality of bolts.

The torque fluctuation absorbing device described in Japan Laid-open Patent Application Publication No. 2008-89017 is provided with a plurality of bolt attaching portions in the annular portion provided on the outer peripheral side of the accommodation portion. Each bolt attaching portion is required to have a predetermined thickness (radial thickness). In other words, it is required to further provide the annular portion having the predetermined radial thickness on the outer peripheral side of the accommodation portion. This results in increase in radial dimension of a device including the flywheel. However, in attempt to inhibit increase in radial dimension of the entire device, the torque limiter is reduced in torque capacity, and besides, the damper part is degraded in torque fluctuation absorbing performance.

BRIEF SUMMARY

It is an object of the present invention to enable a torque limiter disposed in an accommodation portion of a flywheel to reliably have a required torque capacity, and simultaneously, inhibit increase in radial dimension of the entirety of a device including the flywheel.

(1) A torque limiter according to the present invention is fixed to a flywheel. The flywheel includes an annular portion and an accommodation portion provided on an inner peripheral side of the annular portion. Besides, the torque limiter is disposed in an interior of the accommodation portion except for a part thereof fixed to the flywheel. The torque limiter includes a first plate, a second plate, a friction disc, a pressing member and a third plate. The first plate is a member to which a torque is inputted from the flywheel. The second plate is disposed in axial opposition to the first plate. The friction disc is disposed between the first plate and the second plate. The pressing member presses the second plate onto the friction disc. The third plate supports the pressing member together with the second plate therebetween while the pressing member is set in a compressed state.

Moreover, the third plate includes a support portion and a tubular portion. The support portion supports the pressing member. The tubular portion is provided in an outer peripheral part of the support portion, while covering an outer peripheral surface of the friction disc. Besides, the tubular portion is shaped to axially extend in opposition to an inner peripheral surface of the annular portion of the flywheel and includes a plurality of first openings disposed in circumferential alignment.

In the present torque limiter, the pressing member causes the first plate and the second plate to interpose and hold the friction disc therebetween. The pressing member is supported by the third plate.

The torque, outputted from the flywheel, is transmitted to the friction disc through the first plate and is then transmitted therefrom to an output side. When the torque inputted to the friction disc from the flywheel is excessive in magnitude, the friction disc slips while being interposed and held between the first plate and the second plate. Accordingly, the excessive torque is prevented from being transmitted to the output side.

The third plate herein includes the tubular portion in a part thereof opposed to the inner peripheral surface of the annular portion. The tubular portion covers the outer peripheral surface of the friction disc. In other words, the torque limiter includes the tubular portion in the outermost diameter region of a part thereof accommodated in the accommodation portion of the flywheel. Besides, the tubular portion is provided with the plurality of first openings. Therefore, when a plurality of attachment portions (e.g., a plurality of bolt fastening portions) of the flywheel are disposed on the outer peripheral side of the plurality of first openings, interference between the plurality of attachment portions and the third plate can be avoided even if each attachment portion is shaped to protrude radially inward in order to reliably have a required thickness. Because of this, the torque limiter is enabled to reliably have a required torque capacity, and simultaneously, increase in radial dimension of the entirety of a device including the flywheel can be inhibited.

(2) Preferably, the annular portion of the flywheel includes a plurality of attachment portions disposed in circumferential alignment. Each of the plurality of attachment portions includes a protruding portion extending radially inward. In this case, each of the plurality of first openings of the third plate is disposed in a corresponding position to the protruding portion so as to avoid interference between the third plate and the protruding portion.

(3) Preferably, an outer peripheral surface of the tubular portion of the third plate has a diameter greater than a minimum inner diameter of the protruding portion.

Here, the tubular portion of the third plate has a relatively large outer diameter. Hence, the friction disc, disposed on the inner peripheral side of the tubular portion, can be increased in diameter. Consequently, this enables increase in torque capacity of the torque limiter.

(4) Preferably, the pressing member is a cone spring disposed in an interior of the tubular portion of the third plate.

(5) Preferably, the first plate and the second plate are non-rotatable relative to each other.

(6) Preferably, the second plate includes a plurality of pawls in an outer peripheral part thereof. The plurality of pawls extend axially toward the first plate. In this case, the first plate includes a plurality of through holes with which the plurality of pawls of the second plate are engaged.

(7) Preferably, the third plate includes a plurality of second openings in an outer peripheral part thereof. The plurality of second openings enable the plurality of pawls of the second plate to pass therethrough. In this configuration, the second plate can avoid interfering, at the plurality of pawls thereof, with the third plate even when increased in outer diameter.

(8) A torque limiter embedded damper device according to the present invention includes the torque limiter configured as any of the above and a damper unit. The damper unit is provided on an output side of the torque limiter and attenuates fluctuations in rotation transmitted thereto.

(9) A power transmission device according to the present invention includes a flywheel and the torque limiter configured as any of the above. The torque limiter transmits the torque inputted thereto from the flywheel to an output-side member.

Overall, according to the present invention described above, a torque limiter disposed in an accommodation portion of a flywheel is enabled to reliably have a required torque capacity, and simultaneously, increase in radial dimension of the entirety of a device including the flywheel can be inhibited.

DETAILED DESCRIPTION

[Entire Configuration]

Figure 1:
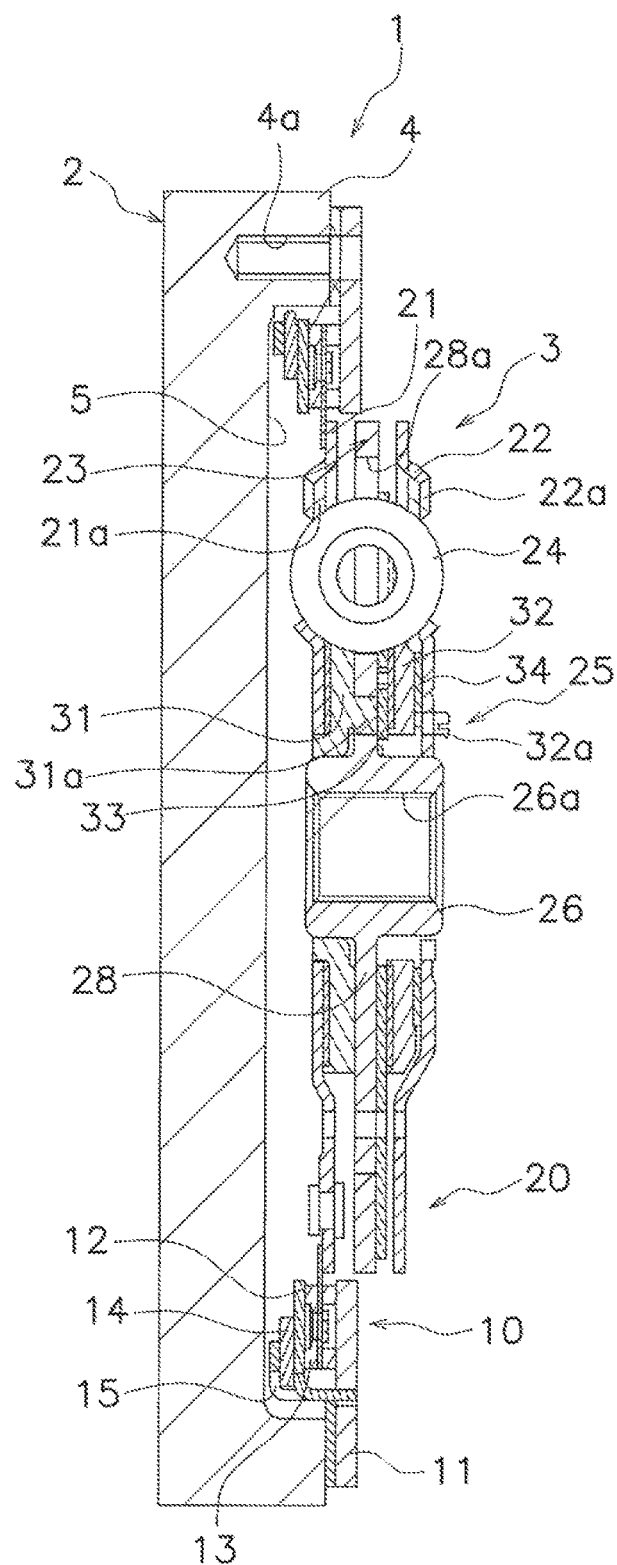
FIG. 1 is a cross-sectional view of a power transmission device according to a preferred embodiment of the present invention.
Figure 2:
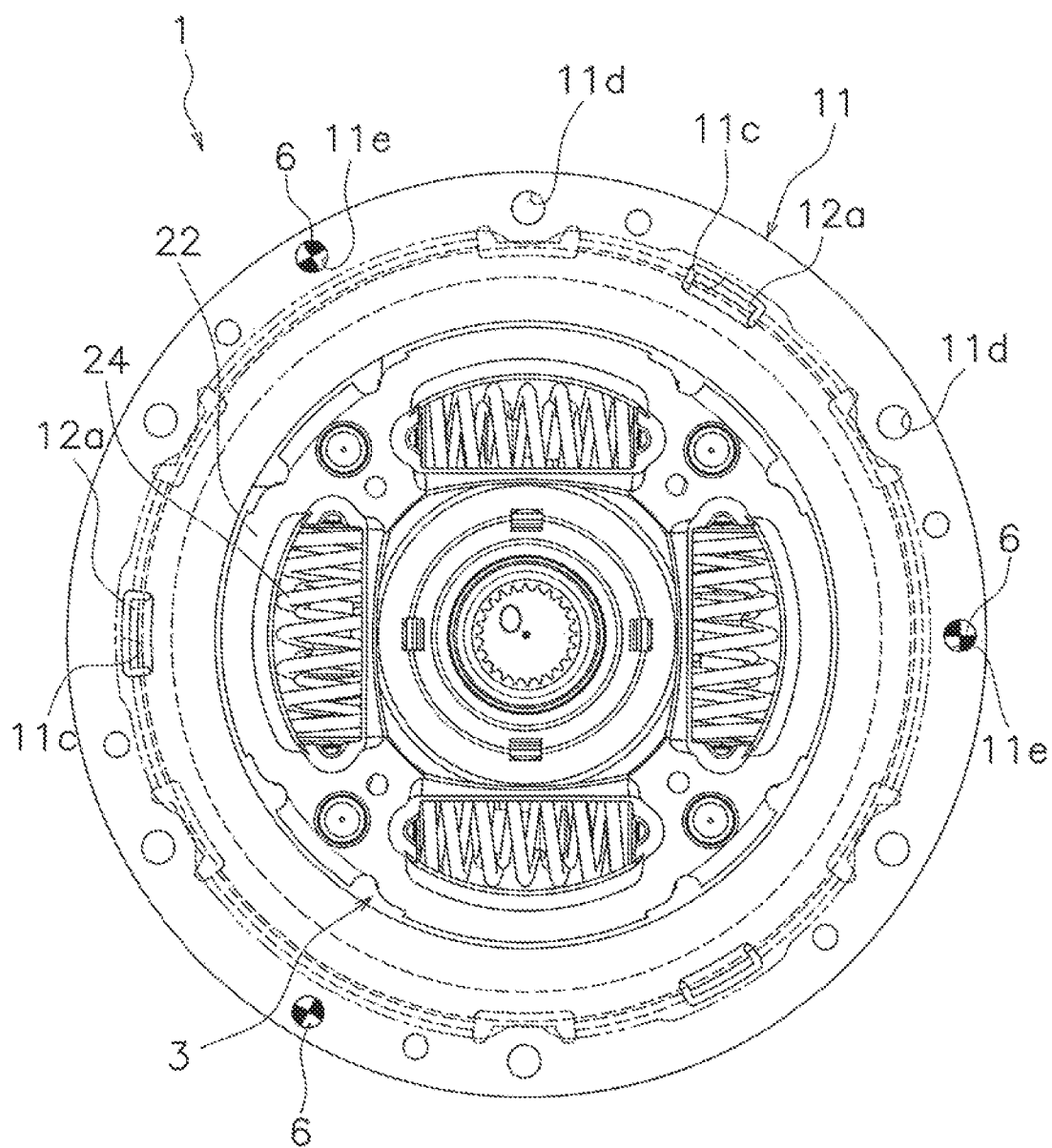
FIG. 2 is a front view of the power transmission device shown in FIG. 1 except for a flywheel.

FIG. 1 is a cross-sectional view of a power transmission device 1 according to a preferred embodiment of the present invention. The power transmission device 1 includes a flywheel 2 and a torque limiter embedded damper device 3. On the other hand, FIG. 2 is a front view of the power transmission device 1 except for the flywheel 2. In FIG. 1, an engine is disposed on the left side of the power transmission device 1, whereas a drive unit, including an electric motor, a transmission and so forth, is disposed on the right side of the power transmission device 1.

[Flywheel 2]

Figure 3:
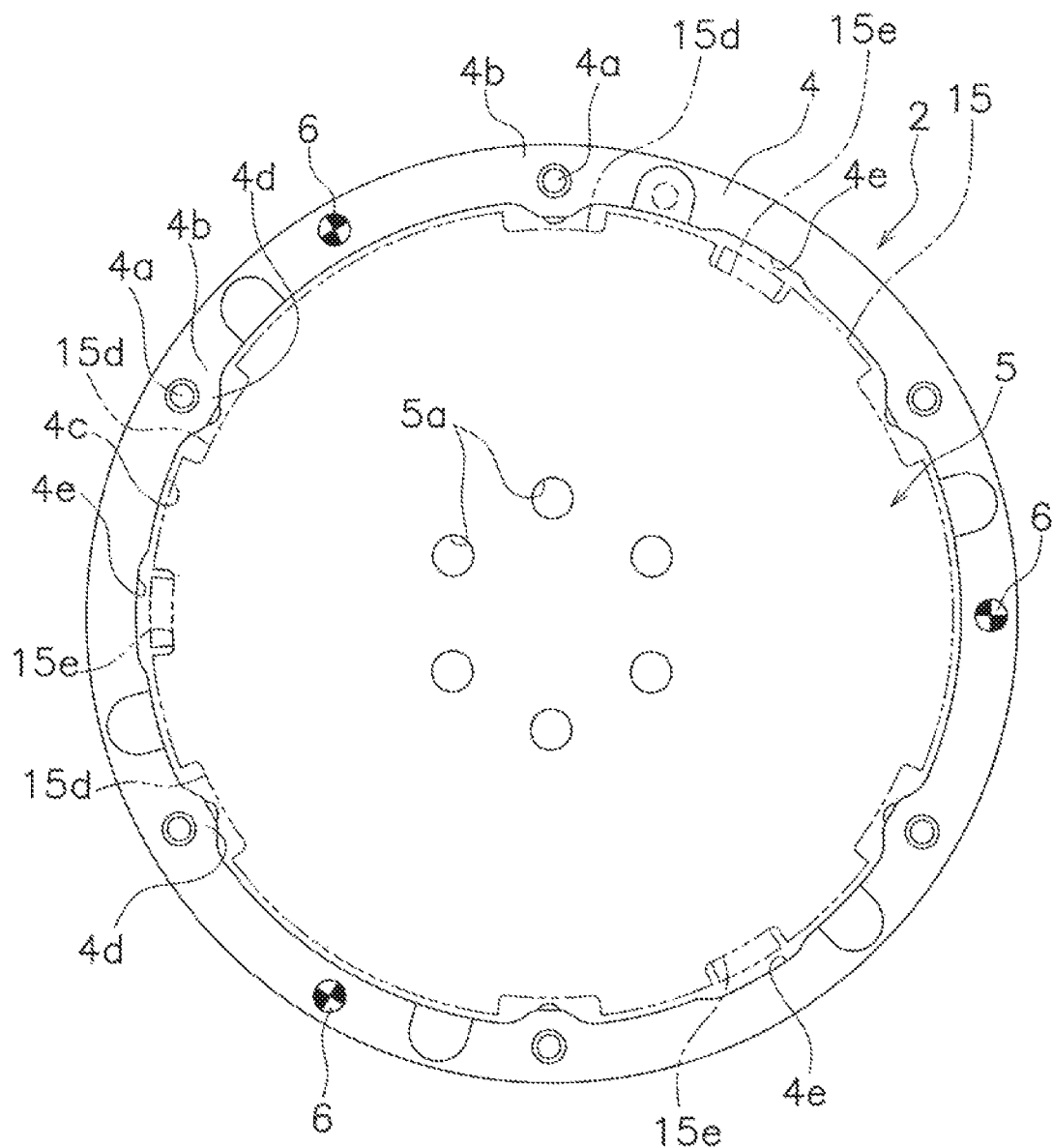
FIG. 3 is a front view of the flywheel.

The flywheel 2 is fixed to an engine-side member (not shown in the drawings). As shown in FIGS. 1 to 3, the flywheel 2 is a disc-shaped member and includes an annular portion 4 and an accommodation portion 5. It should be noted that FIG. 3 is a front view of the flywheel 2.

Figure 4:
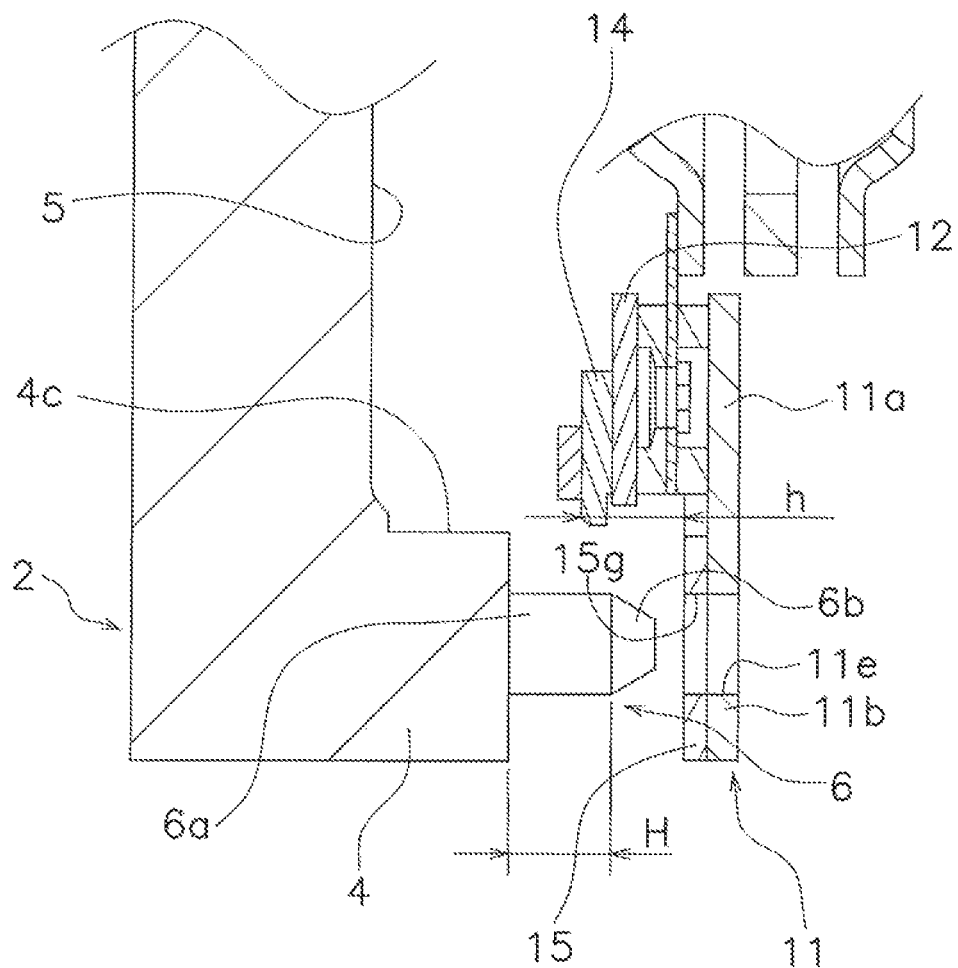
FIG. 4 is a diagram showing a positional relation between a knock pin and a through hole with which the knock pin is engaged.

The annular portion 4 is provided in the outermost peripheral part of the flywheel 2. As shown in FIGS. 2 and 3, a plurality of screw holes 4a are provided on the drive unit-side (right side in FIG. 1) surface of the annular portion 4, and besides, a plurality of knock pins 6 are fixed to the drive unit-side surface of the annular portion 4. The plural screw holes 4a, each having a predetermined depth, are disposed at predetermined intervals in the circumferential direction. On the other hand, the plural knock pins 6 are provided at predetermined intervals in the circumferential direction. As shown in FIG. 4, each knock pin 6 includes a trunk portion 6a and a taper portion 6b. The trunk portion 6a is made in the shape of a column and has height H (the length of the trunk portion 6a protruding from the surface of the annular portion 4 of the flywheel 2). The taper portion 6b extends from the distal end of the trunk portion 6a and is shaped to gradually reduce in outer diameter therefrom.

Surrounding regions of the screw holes 4a of the annular portion 4 are provided as bolt fastening portions 4b (exemplary attachment portions). Each bolt fastening portion 4b includes a protruding portion 4d protruding radially inward from an inner peripheral surface 4c of the annular portion 4. Because of this, the surrounding region of each screw hole 4a has a predetermined thickness. In other words, each bolt fastening portion 4b has enough strength.

The annular portion 4 is provided with a plurality of recesses 4e. The recesses 4e are provided to be recessed radially outward from the inner peripheral surface 4c of the annular portion 4 in regions not provided with the bolt fastening portions 4b.

The accommodation portion 5 is provided radially inside the annular portion 4. The accommodation portion 5 has a predetermined depth from an attachment surface of the annular portion 4 to the engine side. Besides, as shown in FIG. 3, the accommodation portion 5 is provided with a plurality of through holes 5a in the inner peripheral part thereof in order to fix the flywheel 2 to the engine-side member.

[Torque Limiter Embedded Damper Device 3]

The torque limiter embedded damper device 3 (hereinafter simply referred to as "damper device 3" on an as-needed basis) is a device fixed to the annular portion 4 of the flywheel 2 in order to limit a torque transmitted between the engine and the drive unit, and simultaneously, attenuate rotational fluctuations. The damper device 3 includes a torque limiter unit 10 and a damper unit 20.

[Torque Limiter Unit 10]

The torque limiter unit 10 limits a torque transmitted between the flywheel 2 and the damper unit 20. As shown close-up in FIGS. 5 and 6, the torque limiter unit 10 includes a damper cover 11 (exemplary first plate), a pressure ring 12 (exemplary second plate), a friction disc 13, a cone spring 14 (exemplary pressing member) and a damper ring 15 (exemplary third plate).

The damper cover 11 is an annular plate and includes a friction portion 11a, a fixation portion 11b and a plurality of engaging through holes 11c.

The friction portion 11a is provided in the inner peripheral part of the damper cover 11, whereas the fixation portion 11b is provided on the outer periphery of the friction portion 11a. The fixation portion 11b is provided with a plurality of fixation through holes 11d and a plurality of knock pin through holes 11e (see FIG. 4). Bolts are fastened into the screw holes 4a of the flywheel 2 respectively, while penetrating through the fixation through holes 11d respectively. The damper cover 11 is thereby fixed to the surface of the annular portion 4 of the flywheel 2. On the other hand, the knock pin through holes 11e are provided in corresponding positions to the knock pins 6 of the flywheel 2.

The plural engaging through holes 11c, axially penetrating the damper cover 11, are provided radially between the friction portion 11a and the fixation portion 11b. The plural engaging through holes 11c, each elongated in the circumferential direction, are disposed at predetermined intervals in the circumferential direction.

The pressure ring 12 is an annular plate disposed in axial opposition to the friction portion 11a of the damper cover 11 at a predetermined interval. The pressure ring 12 includes a plurality of pawls 12a.

The plural pawls 12a are disposed on the outer peripheral end of the pressure ring 12 at equal angular intervals in the circumferential direction. The pawls 12a are provided to extend axially toward the damper cover 11 from the outer peripheral end of the pressure ring 12 and are engaged with the engaging through holes 11c of the damper cover 11, respectively. Therefore, the damper cover 11 and the pressure ring 12 are non-rotatable relative to each other.

The friction disc 13 is disposed between the friction portion 11a of the damper cover 11 and the pressure ring 12. The friction disc 13 includes a core plate 16 and a pair of friction members 17 fixed to the both lateral surfaces of the core plate 16 by rivets. Here, one of the friction members 17 makes contact with the friction portion 11a of the damper cover 11, whereas the other makes contact with the pressure ring 12.

The cone spring 14 is disposed between the pressure ring 12 and the damper ring 15. The cone spring 14 presses the friction disc 13 through the pressure ring 12 onto the friction portion 11a of the damper cover 11.

Figure 5:
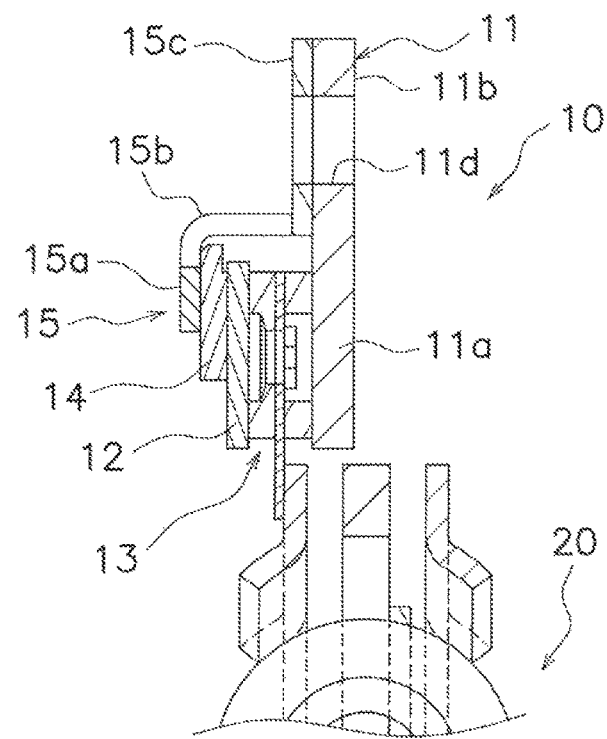
FIG. 5 is a partial enlarged view of FIG. 1.
Figure 6:
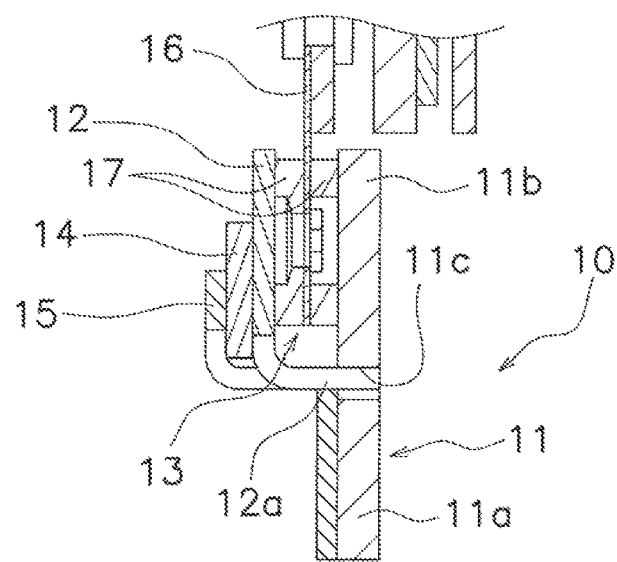
FIG. 6 is a partial enlarged view of FIG. 1.

The damper ring 15 is disposed closer to the engine than the pressure ring 12. The damper ring 15 supports the cone spring 14 together with the pressure ring 12 therebetween, while the cone spring 14 is set in a compressed state. As shown in FIG. 5, the damper ring 15 includes a support portion 15a, a tubular portion 15b and a fixation portion 15c.

The support portion 15a has an annular shape and is provided in the inner peripheral part of the damper ring 15. The support portion 15a is axially opposed to the pressure ring 12 and interposes and holds the cone spring 14 together with the pressure ring 12 therebetween.

Figure 7:
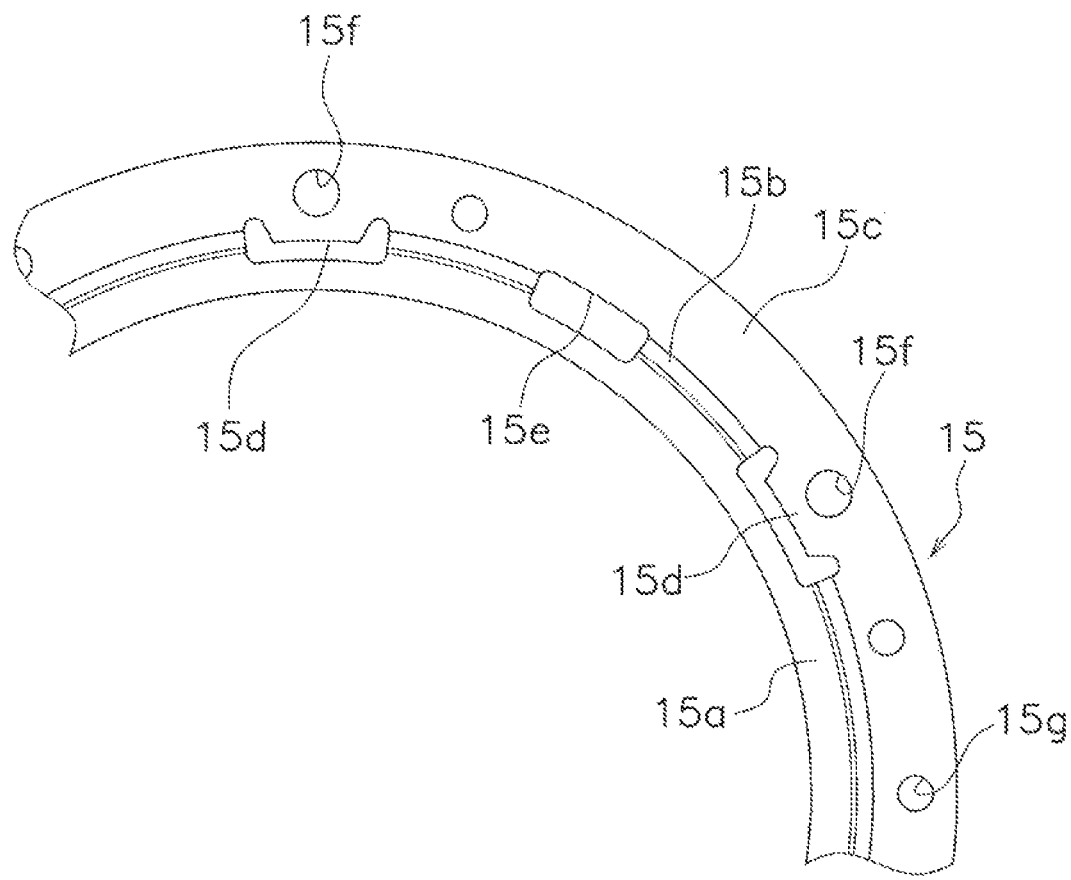
FIG. 7 is a partial front view of a damper ring.

The tubular portion 15b is shaped to extend axially toward the damper cover 11 from the outer periphery of the support portion 15a. The tubular portion 15b is disposed to cover the outer peripheral surface of the friction disc 13, while a predetermined gap is produced therebetween. As shown in FIG. 7, the tubular portion 15b includes a plurality of first openings 15d and a plurality of second openings 15e. The first openings 15d are disposed at predetermined angular intervals in the circumferential direction. This layout is true of the second openings 15e as well.

As shown in FIG. 3, the first openings 15d are provided in corresponding positions to the bolt fastening portions 4b of the flywheel 2. Here, as described above, the protruding portion 4d of each bolt fastening portion 4b is shaped to protrude radially inward from the inner peripheral surface 4c of the annular portion 4 of the flywheel 2. Besides, the diameter of the outer peripheral surface of the tubular portion 15b is greater than the minimum inner diameter of the protruding portion 4d of each bolt fastening portion 4b of the flywheel 2. Because of this, in order to avoid interference between the tubular portion 15b and the protruding portion 4d of each bolt fastening portion 4b, each first opening 15d is shaped to avoid making contact with the protruding portion 4d of each bolt fastening portion 4b in the corresponding position to the protruding portion 4d.

As described above, the plural second openings 15e are provided at predetermined angular intervals in the circumferential direction. The pawls 12a of the pressure ring 12 pass through the second openings 15e, respectively. Therefore, even when the radial position of each pawl 12a of the pressure ring 12 and that of the tubular portion 15b of the damper ring 15 are identical to each other, each pawl 12a and the tubular portion 15b can be avoided from interfering with each other.

The fixation portion 15c extends radially outward from the distal end of the tubular portion 15b. As shown in FIG. 7, the fixation portion 15c is provided with a plurality of fixation through holes 15f and a plurality of knock pin through holes 15g. The fixation through holes 15f are provided on the outer peripheral side of the first openings 15d, respectively. The damper ring 15 is fixed together with the damper cover 11 to the annular portion 4 of the flywheel 2 by bolts that pass through the fixation through holes 15f, respectively. In more detail, the damper ring 15 is attached to the annular portion 4 of the flywheel 2, whereas the damper cover 11 is attached while interposing the damper ring 15 together with the flywheel 2 therebetween. Besides, the knock pin through holes 15g are provided in corresponding positions to the knock pins 6 of the flywheel 2, respectively.

[Damper Unit 20]

As shown in FIG. 1, the damper unit 20 includes a pair of a clutch plate 21 and a retaining plate 22, a hub flange 23, a plurality of torsion springs 24 and a hysteresis generating mechanism 25.

The friction disc 13, composing part of the torque limiter unit 10, is coupled to the outer peripheral part of the clutch plate 21. The clutch plate 21, having a disc shape, is provided with a plurality of window portions 21a. The retaining plate 22 is disposed in axial opposition to the clutch plate 21 at an interval. The retaining plate 22, having a disc shape, is provided with a plurality of window portions 22a. The clutch plate 21 and the retaining plate 22 are fixed to each other by at least one rivet (not shown in the drawings), while being immovable relative to each other in both axial and rotational directions.

The hub flange 23 includes a hub 26 and a flange 28. The hub, having a tubular shape, is provided in the center part of the hub flange 23. The flange 28 extends radially outward from the outer peripheral surface of the hub 26. The hub 26 is provided with a spline hole 26a on the inner peripheral surface thereof, whereby an input shaft of the drive unit is capable of being spline-coupled to the spline hole 26a. The flange 28, having a disc shape, is disposed axially between the clutch plate 21 and the retaining plate 22. The flange 28 is provided with a plurality of accommodation portions 28a. The accommodation portions 28a are provided in corresponding positions to pairs of the window portions 21a and 22a of the clutch plate 21 and the retaining plate 22, respectively.

The plural torsion springs 24 are accommodated in the accommodation portions 28a of the flange 28, respectively, while being held in both axial and radial directions by the pairs of the window portions 21a and 22a of the clutch plate 21 and the retaining plate 22, respectively. Besides, the both circumferential ends of each torsion spring 24 are capable of making contact with circumferential end surfaces of each accommodation portion 28a and each pair of window portions 21a and 22a.

As shown in FIG. 1, the hysteresis generating mechanism 25 includes a first bushing 31, a second bushing 32, a friction plate 33 and a cone spring 34.

The first bushing 31, having an annular shape, is disposed axially between the inner peripheral part of the clutch plate 21 and that of the flange 28 of the hub flange 23. The first bushing 31 is provided with a plurality of engaging protrusions 31a protruding in the axial direction. Each of the engaging protrusions 31a is engaged with each of holes provided in the flange 28 through a predetermined gap. Therefore, the first bushing 31 is rotatable relative to the hub flange 23 only in a predetermined angular range.

Both the second bushing 32 and the friction plate 33 are disposed axially between the retaining plate 22 and the flange 28 of the hub flange 23. The second bushing 32, having an annular shape, is provided with a plurality of engaging protrusions 32a protruding in the axial direction. The engaging protrusions 32a are engaged with holes provided in the retaining plate 22, respectively. Therefore, the second bushing 32 and the retaining plate 22 are non-rotatable relative to each other. The friction plate 33 is disposed between the flange 28 and the second bushing 32, while being rotatable relative to these members 28 and 32.

The cone spring 34 is disposed axially between the retaining plate 22 and the second bushing 32. The cone spring 34 presses both the second bushing 32 and the friction plate 33 onto the first bushing 31 and presses the first bushing 31 onto the clutch plate 21.

In the hysteresis generating mechanism 25 configured as described above, when the hub flange 23 and both the clutch plate 21 and the retaining plate 22 are rotated relative to each other, friction resistance (hysteresis torque) is generated between the first bushing 31 and the clutch plate 21 and is also generated between the second bushing 32 and the friction plate 33.

[Relation between Torque Limiter Unit 10 and Knock Pins 6]

Except for the fixation portions 11b and 15c of the damper cover 11 and the damper ring 15, the torque limiter unit 10 is disposed in the accommodation portion 5 of the flywheel 2. Now, in assembling the power transmission device 1, the torque limiter unit 10 and the damper unit 20 are firstly assembled as the damper device 3, and then, the damper device 3 is fixed to the flywheel 2. At this time, the knock pins 6 of the flywheel 2 are fitted into pairs of knock pin through holes 11e and 15g of the damper cover 11 and the damper ring 15, respectively, whereby the flywheel 2 and the damper device 3 are radially positioned.

Here, the protruding portions 4d of the bolt fastening portions 4b of the flywheel 2 protrude radially inward while passing through the first openings 15d of the damper ring 15, respectively. Because of this, when the flywheel 2 and the damper device 3 has not been radially positioned in assemblage, it is concerned that the protruding portions 4d of the bolt fastening portions 4b interfere with the cone spring 14 while protruding radially inward through the first openings 15d, respectively.

In view of the above, as shown in FIG. 4, length h is set to be shorter than length H, where the length H is defined as the trunk length of each knock pin 6 and the length his defined as the length between the engine-side surface of the cone spring 14 (i.e., the surface facing the interior of the accommodation portion 5) and the engine-side surface of the damper ring 15 (i.e., the surface at which the torque limiter unit 10 is attached to the flywheel 2).

Therefore, when the damper device 3, including the torque limiter unit 10 and the damper unit 20, is accommodated in the accommodation portion 5 of the flywheel 2, the knock pins 6 are firstly fitted into the pairs of knock pin through holes 11e and 15g of the damper device 3, respectively. Accordingly, the flywheel 2 and the damper device 3 are radially positioned, and subsequently, the cone spring 14 enters the accommodation portion 5. Therefore, it is possible to avoid interference between the cone spring 14 and the protruding portions 4d of the bolt fastening portions 4b of the flywheel 2.

[Actions]

Power, transmitted from the engine to the flywheel 2, is inputted to the damper unit 20 through the torque limiter unit 10. In the damper unit 20, the power is inputted to both the clutch plate 21 and the retaining plate 22, to which the friction disc 13 of the torque limiter unit 10 is fixed, and is then transmitted to the hub flange 23 through the torsion springs 24. Subsequently, the power is further transmitted from the hub flange 23 to the electric motor, the transmission, a power generator and so forth disposed on the output side.

Incidentally, for instance in starting the engine, chances are that an excessive torque is transmitted from the output side to the engine because the amount of inertia is large on the output side. In such a case, the magnitude of torque to be transmitted to the engine side is limited to a predetermined value or less by the torque limiter unit 10.

In the damper unit 20, when the power is transmitted to the torsion springs 24 from the clutch plate 21 and the retaining plate 22, the torsion springs 24 are compressed. Besides, the torsion springs 24 are repeatedly compressed and extended by torque fluctuations. When the torsion springs 24 are compressed and extended, torsion (displacement) is produced between the hub flange 23 and both the clutch plate 21 and the retaining plate 22. The hysteresis generating mechanism 25 is actuated by this torsion and generates a hysteresis torque. Accordingly, torque fluctuations are attenuated.

[Features]

(1) The flywheel 2 reliably has an enough thickness at the bolt fastening portions 4b. Because of this, even when the damper device 3 is fixed to the flywheel 2 by bolts, this does not result in shortage of strength at the bolt fastening portions 4b.

On the other hand, the tubular portion 15b of the damper ring 15, which is the outermost peripheral portion of the body part of the torque limiter unit 10, is provided with the first openings 15d so as to avoid interference between the damper ring 15 and the bolt fastening portions 4b (the protruding portions 4d) of the flywheel 2. This enables increase in outer diameter of the tubular portion 15b of the damper ring 15. Therefore, a friction disc with a large outer diameter can be employed as the friction disc 13, and compactness in size of the power transmission device can be achieved without impairing the torque capacity.

(2) The damper ring 15 is provided with the second openings 15e in order to avoid interference between the damper ring 15 and the pawls 12a of the pressure ring 12. Because of this, it is concerned that the pawls 12a of the pressure ring 12 are exposed outward and interferes with the inner peripheral surface 4c of the annular portion 4 of the flywheel 2.

However, the annular portion 4 of the flywheel 2 is herein provided with the recesses 4e on the inner peripheral surface 4c, and the recesses 4e are recessed to the outer peripheral side in positions opposed to the second openings 15e. Because of this, it is possible to avoid interference of the pawls 12a of the pressure ring 12 with the annular portion 4 of the flywheel 2.

(3) The damper ring 15 is provided with the first openings 15d, whereby the protruding portions 4d of the bolt fastening portions 4b of the flywheel 2 protrude radially inward while passing through the first openings 15d of the damper ring 15, respectively. Because of this, it is concerned that in assembling the damper device 3 to the accommodation portion 5 of the flywheel 2, the protruding portions 4d interfere with the cone spring 14 while protruding radially inward through the first openings 15d.

However, in assemblage, the knock pins 6 of the flywheel 2 are fitted into the pairs of knock pin through holes 11e and 15g of the damper device 3, respectively, before the cone spring 14 is accommodated in the accommodation portion 5 of the flywheel 2, whereby the flywheel 2 and the damper device 3 are radially positioned. Because of this, it is possible to avoid interference between the protruding portions 4d of the flywheel 2 and the cone spring 14.

[Other Preferred Embodiments]

The present invention is not limited to the preferred embodiment described above, and a variety of changes or modifications can be made without departing from the scope of the present invention.

(a) In the aforementioned preferred embodiment, the present invention has been applied to the damper device 3 embedded with not only the torque limiter unit 10 but also the damper unit 20. However, the present invention is similarly applicable to a device without embedded with the damper unit 20.

(b) In the aforementioned preferred embodiment, the damper cover 11 and the damper ring 15 are configured to be fixed to the flywheel 2. However, the damper cover 11 and the damper ring 15 can be configured to be fixed to each other in advance, and thereafter, one of the damper cover 11 and the damper ring 15 can be configured to be fixed to the flywheel 2.

REFERENCE SIGNS LIST

1 Power transmission device
2 Flywheel
3 Torque limiter embedded damper device
4 Annular portion
4b Bolt fastening portion (attachment portion)
4c Annular portion inner peripheral surface
4d Protruding portion
5 Accommodation portion
10 Torque limiter unit
11 Damper cover (first plate)
11c Engaging through hole
12 Pressure ring (second plate)
12a Pawl
13 Friction disc
14 Cone spring (pressing member)
15 Damper ring (third plate)
5a Support portion
15b Tubular portion
15c Fixation portion
15d First opening
15e Second opening

What is claimed is:

1. A torque limiter fixed to a flywheel including an annular portion and an accommodation portion provided on an inner peripheral side of the annular portion, the torque limiter disposed in an interior of the accommodation portion except for a part thereof fixed to the flywheel, the torque limiter comprising:

a first plate to which a torque is inputted from the flywheel;
a second plate axially opposed to the first plate;
a friction disc disposed between the first plate and the second plate;
a pressing member configured to press the second plate onto the friction disc; and
a third plate configured to support the pressing member together with the second plate therebetween while the pressing member is set in a compressed state, wherein
the third plate includes
a support portion configured to support the pressing member, and
a tubular portion provided in an outer peripheral part of the support portion, the tubular portion covering an outer peripheral surface of the friction disc, the tubular portion axially extending and opposed to an inner peripheral surface of the annular portion of the flywheel, the tubular portion including a plurality of first openings circumferentially aligned.

2. The torque limiter according to claim 1, wherein
the annular portion of the flywheel includes a plurality of attachment portions circumferentially aligned, each of the plurality of attachment portions including a protruding portion extending radially inward, and
each of the plurality of first openings of the third plate is disposed in a corresponding position to the protruding portion so as to avoid interference between the third plate and the protruding portion.

3. The torque limiter according to claim 2, wherein an outer peripheral surface of the tubular portion of the third plate has a diameter greater than a minimum inner diameter of the protruding portion.

4. The torque limiter according to claim 1, wherein the pressing member is a cone spring disposed in an interior of the tubular portion of the third plate.

5. The torque limiter according to claim 1, wherein the first plate and the second plate are non-rotatable relative to each other.

6. The torque limiter according to claim 5, wherein
the second plate includes a plurality of pawls in an outer peripheral part thereof, the plurality of pawls extending axially toward the first plate, and
the first plate includes a plurality of through holes with which the plurality of pawls of the second plate are engaged.

7. The torque limiter according to claim 6, wherein the third plate includes a plurality of second openings in an outer peripheral part thereof, the plurality of second openings allowing the plurality of pawls of the second plate to pass therethrough.

8. A torque limiter embedded damper device comprising:
the torque limiter recited in claim 1; and
a damper unit configured to attenuate fluctuations in rotation transmitted thereto, the damper unit provided on an output side of the torque limiter.

9. A power transmission device comprising:
a flywheel; and
the torque limiter recited in claim 1, the torque limiter configured to transmit the torque inputted thereto from the flywheel to an output-side member.

* * * * *